United States Patent [19]

Mislin et al.

[11] 4,188,187
[45] Feb. 12, 1980

[54] DYEING OF POLYAMIDE TEXTILES AND ANTHRAQUINONE DYESTUFFS THEREFOR

[75] Inventors: Roland Mislin, Saint-Louis, France; Karl-Ulrich Steiner, Binningen, Switzerland

[73] Assignee: Sandoz Ltd., Basel, Switzerland

[21] Appl. No.: 893,730

[22] Filed: Apr. 5, 1978

[30] Foreign Application Priority Data

Apr. 6, 1977 [CH] Switzerland .................... 4357/77

[51] Int. Cl.² ............................................. C09B 1/00
[52] U.S. Cl. ......................................... 8/39 B; 8/54; 8/79; 260/371; 260/379
[58] Field of Search ................................ 8/39 B, 79

[56] References Cited

FOREIGN PATENT DOCUMENTS

| 1110959 | 2/1956 | France. |
|---------|--------|---------|
| 1238515 | 7/1960 | France. |
| 1335328 | 7/1963 | France. |
| 313562 | 4/1956 | Switzerland. |
| 928619 | 6/1963 | United Kingdom. |

OTHER PUBLICATIONS

Venkataraman, K., "The Chemistry of Synthetic Dyes", vol. V, (Academic Press, 1971), pp. 57–59, 63–75.

*Primary Examiner*—A. Lionel Clingman
*Attorney, Agent, or Firm*—Gerald D. Sharkin; Richard E. Vila; Thomas C. Doyle

[57] ABSTRACT

A process for dyeing or printing natural or synthetic polyamide textile substrates comprising employing, as dyestuff, a compound of formula I,

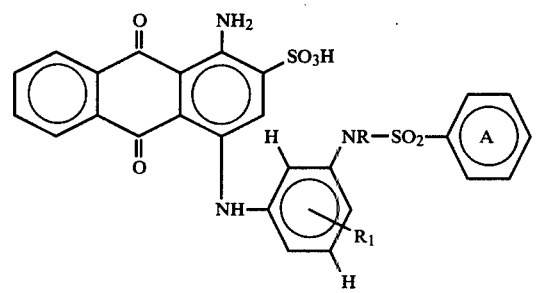

in which
  R is hydrogen, methyl or ethyl,
  $R_1$ is hydrogen, methyl or ethyl, and
  the ring A is unsubstituted or monosubstituted by halogen, $(C_{1-2})$alkyl, $(C_{1-2})$alkoxy or alkyl$(C_{1-2})$carbonylamino or disubstituted by methyl groups, in free acid or salt form.

11 Claims, No Drawings

DYEING OF POLYAMIDE TEXTILES AND ANTHRAQUINONE DYESTUFFS THEREFOR

The present invention relates to a process for dyeing or printing natural or synthetic polyamide textile substrates.

More particularly, the present invention provides a process for dyeing or printing natural or synthetic polyamide textile substrates comprising employing, as dyestuff, a compound of formula I,

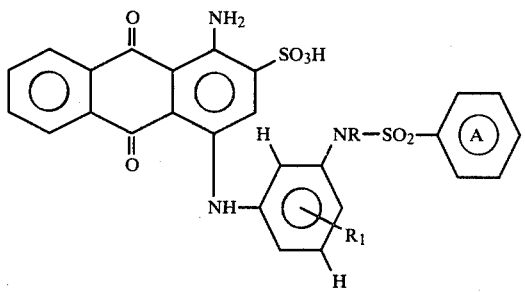

in which
R is hydrogen, methyl or ethyl,
$R_1$ is hydrogen, methyl or ethyl, and
the ring A is unsubstituted or monosubstituted by halogen, $(C_{1-2})$alkyl, $(C_{1-2})$alkoxy or alkyl$(C_{1-2})$ carbonylamino or disubstituted by methyl groups, in free acid or salt form.

By halogen as used herein is meant chlorine, bromine or fluorine.

Any halogen substituent on ring A is preferably chlorine. Any alkyl substituent is preferably methyl. Any alkoxy substituent is preferably methoxy. When the ring A is monosubstituted the substituent is preferably in the position para to the —NR—SO$_2$— group. More preferably the ring A is unsubstituted or monosubstituted by chlorine or methyl, especially in said para position.

$R_1$, when methyl or ethyl, is preferably in the position ortho to the —NR—SO$_2$—group. Preferably $R_1$ is $R_1'$, where $R_1'$ is hydrogen or methyl, more preferably hydrogen.

R is most preferably hydrogen.

Preferably the process is carried out by dyeing or printing employing a compound of formula I',

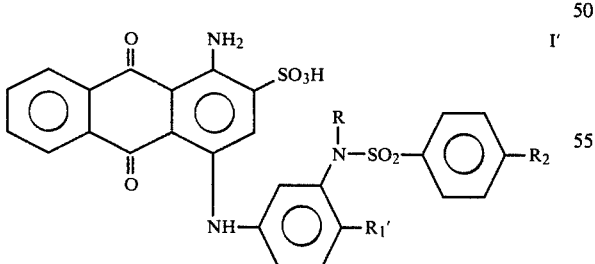

in which
R and $R_1'$ are as defined above, and
$R_2$ is hydrogen, chlorine or methyl, in free acid or salt form, with those compounds where R and $R_1'$ are both hydrogen being especially preferred.

The present invention further provides compounds of formula Ix,

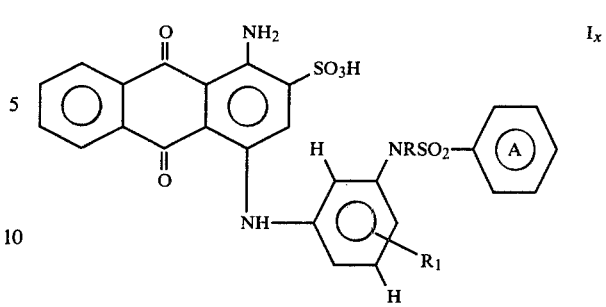

in which
R, $R_1$ and the ring A are as defined above, with the proviso that when the ring A is monosubstituted by methyl in the para position at least one of R and $R_1$ is other than hydrogen,
which compounds are in the free acid or salt form.

Representative compounds of formula Ix are those wherein the ring A is unsubstituted or monosubstituted by halogen or $(C_{1-2})$alkoxy (preferably methoxy), preferably in the para position, or disubstituted by methyl groups.

Also representative are compounds wherein the ring A is unsubstituted or monosubstituted by methoxy, preferably in the para position with those wherein R and $R_1$ are both hydrogen being most preferred.

The salt form of the compounds of formula I, I' and Ix, may be any salt form conventional for anionic dyestuffs, for example an alkali metal salt such as the sodium, lithium or potassium salt; an alkaline earth metal salt such as the magnesium salt; or an ammonium salt, such as unsubstituted ammonium, mono-, di- or tri($C_{1-4}$) alkylammonium, mono-, di- or tri-2,3 or 4-hydroxy($C_{2-4}$) alkylammonium (especially mono-, di- or triethanolammonium or mono-, di- or triisopropanolammonium) or pyridinium.

Preferably the compounds of formula I, I' and Ix are in salt form, more preferably in the alkali metal or unsubstituted ammonium salt form.

The compounds of formula I, I' and Ix may be prepared by
(a) acrylating a compound of formula II,

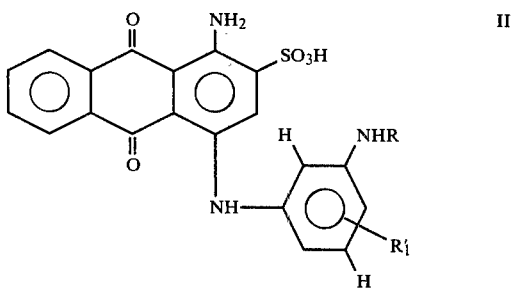

which compound is in free acid or salt form, with a functional derivative of a sulphonic acid or formula III,

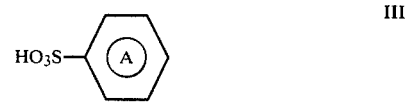

or (b) reacting a compound of formula IV,

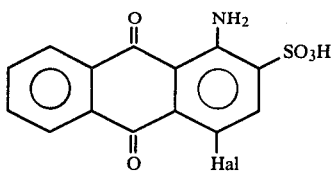

in which Hal is halogen, preferably chlorine or bromine, especially bromine, which compound is in free acid or salt form, with a compound of formula V,

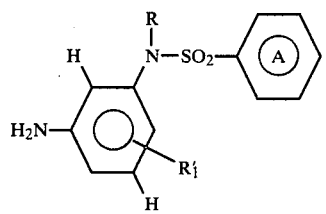

Suitable functional derivatives of the compound of formula III are the esters such as the methyl or ethyl esters and acid halides. Preferably an acid halide is used, in particular the acid chloride.

Processes (a) and (b) may be effected in accordance with known methods. In process (a) the reaction is conveniently carried out under mild conditions in order to avoid saponification of the derivative of the compound of formula III, for example at temperatures from room temperature to 60° C. and with a pH value of not more than 10.

The products obtained may be isolated by conventional methods. In general, as a result of the reaction conditions, compounds of formula I, I' and Ix are obtained which are in the salt form, which compounds may be converted into the free acid form in accordance with known methods.

The compounds of formula I, I' and Ix are, especially in the salt form, well soluble in water.

The compounds of formula II may be prepared by reacting a compound of formula IV with a corresponding optionally substituted metaphenylenediamine in accordance with known methods.

The compounds of formulae III, IV and V are either known or may be prepared by known methods from available starting materials.

The polyamide substrates which are dyed or printed in accordance with the process of the present invention include wool, silk, Nylon 6 and Nylon 66, with Nylon 6 and Nylon 66 being the preferred substrates. The substrate may be in fibre, fabric or yarn form which may also be half-finished or finished goods such as fibres, yarns, carpets, felts or woven goods etc.

The process according to the present invention may be carried out by exhaust dyeing, pad dyeing or printing in accordance with conventional methods. For the exhaust dyeing method, dyeing is preferably carried out in a neutral to weakly acid dyebath. Preferably dyeing is carried out by the exhaust dyeing method. The process of the present invention is especially suitable for the exhaust dyeing of synthetic polyamide from a neutral dyebath.

The dyeings and prints obtained according to the process of the present invention exhibit notable light- and wet-fastnesses.

The process may also be carried out employing a dyestuff of formula I together with one or more other dyestuffs which build-up on polyamide fibers under the same conditions and which give dyeings having comparable light- and wet-fastnesses, e.g., C.I. Acid Orange 127 and or C.I. Red 67 and/or 299. Such combination dyeings exhibit notable resistance to catalytical fading.

The compounds of formula I may be employed as such for dyeing or may be made up into liquids, solid or paste dyeing preparations. Preferably, dyeing preparations especially solid preparations of the dyestuffs of formula I are employed.

Such solid preparations preferably contain 10 to 90, more preferably 30 to 85% by weight of dyestuff. Preferred solid preparations are those in which the dyestuff is mixed with blending agents such as Glauber's salt, sodium chloride, sodium carbonate or dextrin and with conventional additives such as solubilizing agents, e.g., mono-, di- or triethanol- or isopropanolamine or urea and/or with anionic or non-ionic dispersing agents, e.g., polyvinyl alcohol, polyglycolethers, alkylpolyglycol ethers, alkylphenylpolyglycol ethers, lignin sulphonate sulphonated benzene or naphthalene derivatives such as the condensation product of formaldehyde with naphthalene sulphonic acids, optionally together with benzene sulphonic acid. Preferably, the preparations contain 5-80%, more preferably 20-70% by weight of the additives (other than the blending agent). Such solid preparations are formed in conventional manner.

The liquid preparations may be made in conventional manner by dissolving the dyestuff in solvent, and optionally admixing solubilizing agents and/or dispersing agents therewith for example any of those mentioned above.

The paste preparations which may contain conventional additives may be made in accordance with known methods.

Clear, deep prints are obtained with the dyestuffs of formula I. Printing pastes containing relatively high concentrations of dyestuff, for example up to 80 g, preferably 5 to 50 g dyestuff (preferably in salt form, especially the sodium salt form) per kilo printing paste may be prepared. The printing pastes may contain, in addition to the dyestuff, conventional additives such as thickeners e.g., carob bean gum; water, blending agents e.g., dextrin; solvents; dissolving agents, e.g., thiodiethylene glycol and/or buffering agents.

The following Examples further serve to illustrate the invention. In the Examples the parts and percentages are by weight and the temperatures are in degrees centigrade.

EXAMPLE A 4.3 Parts 1-amino-4-(3'-amino-4'-methylphenylamino)-anthraquinone-2-sulphonic acid are mixed with 150 parts water and 50 parts acetone at room temperature. The pH is adjusted to a value of from 8 to 8.5 with sodium carbonate. Subsequently, a solution of 3.0 parts p-chlorobenzenesulphonic acid chloride in 20 parts acetone are added dropwise thereto, the pH value being maintained at 8.0 to 8.5. Thin layer chromatography may be used to determine the completion of the reaction. The product, which is salted out with sodium chloride, corresponds to the formula (1),

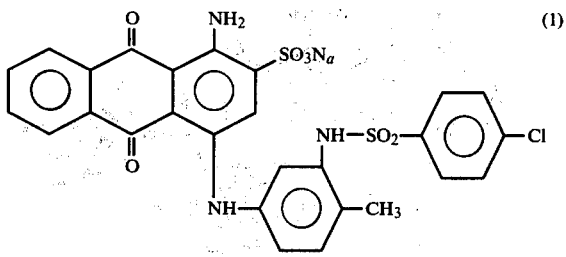

and gives dyeings on wool and nylon of pure reddish-blue shade with good wet- and light-fastnesses.

EXAMPLE B 20.5 parts of 1-amino-4-(3'-aminophenylamino)-anthraquinone-2-sulphonic acid are mixed with 200 parts water and 70 parts acetone. The pH is adjusted to 8-9 by the addition of 10% sodium hydroxide solution. Subsequently, 9 parts benzenesulphonic acid chloride are added dropwise thereto during which time the pH is held at 8-9 by addition of 10% sodium hydroxide solution. When the thin layer chromatogramm shows that no more starting material is present, the product is isolated as described in Example A. The dyestuff obtained is of formula (2)

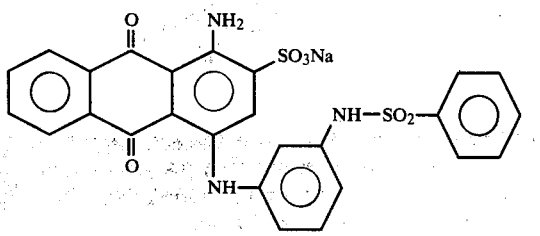

dyes wool and nylon in reddish blue shades.

Further dyestuffs of formula I' which may be prepared in analogy with the procedure given in Examples A and B are given in the following Table:

| Example No. | R | $R_1$ | Ring A |
|---|---|---|---|
| C | H | H | -C6H3(CH3)2 (2,3-dimethylphenyl) |
| D | H | H | -C6H4-NHCOCH3 |

The compound of formula I of formula (3)

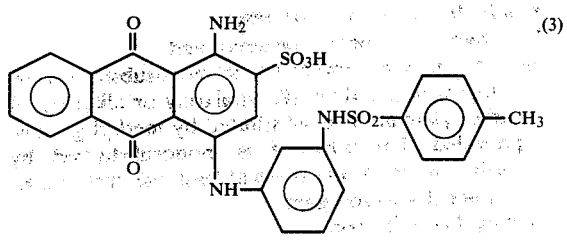

may be prepared as follows:

20.5 parts 1-amino-4-(3'-aminophenylamino)-anthraquinone-2-sulphonic acid are entered into 200 parts water and are heated to 50°. The pH value is adjusted to 5 to 5.5 with a 10% sodium carbonate solution. Subsequently, 10 parts p-toluene sulphonic acid chloride are added in small portions, the pH value being maintained at 5-5.5 with the addition of 10% sodium carbonate. When no more starting product is shown by a thin layer chromatogramm to be present, the product is isolated as described in Example A.

Other salt forms of the dyes of Examples A to D may be obtained by using appropriate reaction and isolation conditions.

In the following Examples 1 to 5, the dyestuffs of formulae (1) to (3) are blended with dextrin to a 40% dye content, C.I. Acid Orange 127 is blended with dextrin to a 33.8% dye content, C.I. Acid Orange 67 is blended with Glauber's salt to a dye content of 83% and C.I. Acid Red 299 is blended with dextrin to a dye content of 38%. All parts in the following Examples are based on the blended dyestuffs.

EXAMPLE 1

1 Part of the dyestuff of formula (1) is dissolved in 6000 parts water at 40°. 4 Parts ammonium sulphate are added thereto. 100 Parts synthetic polyamide (Nylon 6 or Nylon 66) yarn are entered into the dyebath which is heated to the boil over a period of 30 minutes. Dyeing is carried out at the boil for 1 hour. Subsequently, the yarn is rinsed and dried and a brilliant reddish blue dyeing with good fastness is obtained.

Wool may also be dyed in accordance with the above-described procedure and dyeings having similar properties are obtained.

EXAMPLE 2

0.27 Parts of dyestuff of formula (3), 1.31 parts of C.I. Acid Orange 127 and 0.16 parts C.I. Acid Red 299 are dissolved in 6000 parts water. 4 Parts ammonium sulphate are added to the dyebath. Subsequently 100 parts synthetic polyamide (Nylon 6 or Nylon 66) yarn are entered into the dyebath which is heated to the boil over a period of 30 minutes. Dyeing is carried out at the boil for 1 hour, the yarn is then rinsed and dried. A brown dyeing having good light- and wet-fastness is obtained.

EXAMPLE 3

In place of the dyestuffs used in Example 2, 1.03% Acid Orange 127, 0.2% Acid Red 299 and 0.71% dyestuff of formula (3) are used and dyeing is effected in accordance with the procedure of Example 2. A brown dyeing having good light- and wet-fastness is obtained.

EXAMPLE 4

In place of the dyestuffs used in Example 2, the following dyestuffs are used:

0.3% C.I. Acid Orange 67, 0.22% C.I. Acid Red 299 and 0.65% dyestuff of formula (3).

Dyeing is effected as described in Example 2. An olive green dyeing with good light- and wet-fastness is obtained.

EXAMPLE 5

A printing paste is prepared as follows:

65 Parts dyestuff of formula (3) are made into a paste with 25 parts thiodiethylene glycol and 25 parts diethylene glycol monobutyl ether, the whole is then dissolved in 265 parts boiling water and the solution is stirred into 500 parts corn starch thickener (9%). Subsequently, 60 parts thiourea and 60 parts ammonium tartrate are stirred in until dissolved.

The printing paste is printed onto non-texturised polyamide in accordance with known methods and is subsequently fixed by treating for 20 minutes at 102° C. with saturated cream. The fixed print is cold washed, warm washed, rinsed with luke-warm water and finally rinsed cold.

Printing pastes employing the dyestuffs of Examples A to D may be made in analogous manner.

What is claimed is:

1. A process for dyeing or printing natural or synthetic polyamide textile substrates comprising employing, as dyestuff, a compound of formula I,

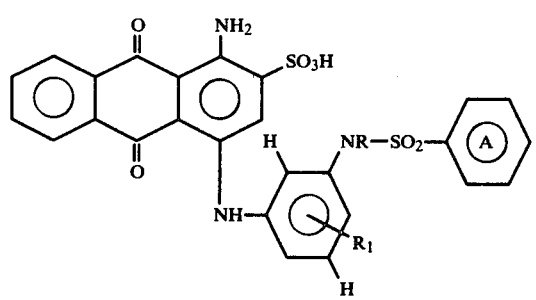

in which
R is hydrogen, methyl or ethyl,
$R_1$ is hydrogen, methyl or ethyl, and
the ring A is unsubstituted or monosubstituted by halogen, $(C_{1-2})$alkyl, $(C_{1-2})$alkoxy or alkyl$(C_{1-2})$ carbonylamino or disubstituted by methyl groups,
in free acid or salt form.

2. The process of claim 1, wherein, in the compound of formula I, ring A is unsubstituted or mono-substituted by chlorine or methyl.

3. The process of claim 1, in which, in the compound of formula I, $R_1$ is hydrogen or methyl.

4. The process of claim 1, in which, in the compound of formula I, R is hydrogen.

5. The process of claim 1, in which the compound of formula I is in salt form.

6. The process of claim 1, in which the substrate is dyed by the exhaust dyeing method.

7. A process according to claim 1 wherein, in the compound of formula I, R is hydrogen, $R_1$ is hydrogen or methyl and ring A is unsubstituted or mon-substituted by chlorine or methyl.

8. A process according to claim 1 wherein the dyestuff is a compound of formula I'

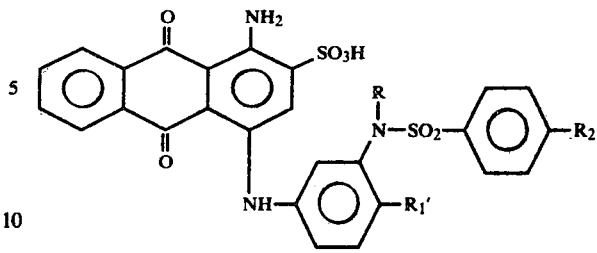

in which
R is hydrogen, methyl or ethyl,
$R_1'$ is hydrogen or methyl, and
$R_2$ is hydrogen, chlorine or methyl
in free acid or salt form.

9. A process according to claim 1 wherein the dyestuff is a compound of formula Ix

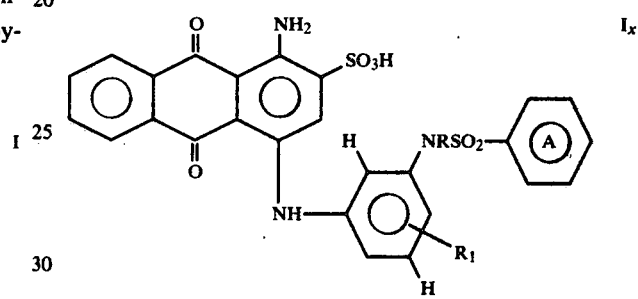

in which
R, $R_1$ and the ring A are as defined in claim 1, with the proviso that when the ring A is monosubstituted by methyl in the para-position at least one of R and $R_1$ is other than hydrogen,
which compound is in free acid or salt form.

10. A solid dyestuff preparation or printing paste comprising as dyestuff a compound of formula I, as defined in claim 1.

11. A solid dyestuff preparation or printing paste according to claim 10 comprising as dyestuff a compound of formula Ix

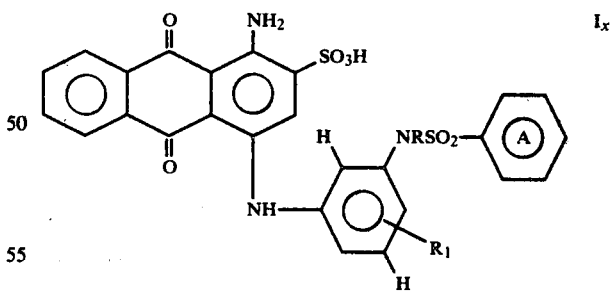

in which
R is hydrogen, methyl or ethyl
$R_1$ is hydrogen, methyl or ethyl, and
the ring A is unsubstituted or monosubstituted by halogen, $(C_{1-2})$ alkyl, $(C_{1-2})$ alkoxy or alkyl $(C_{1-2})$ carbonylamino or disubstituted by methyl groups, provided that when it is monosubstituted by methyl in the para-position at least one of R and $R_1$ is other than hydrogen,
in free acid or salt form.

* * * * *